(12) United States Patent
Yeh et al.

(10) Patent No.: US 10,209,798 B2
(45) Date of Patent: Feb. 19, 2019

(54) TOUCH DISPLAY DEVICE

(71) Applicant: AU Optronics Corporation, Hsin-Chu (TW)

(72) Inventors: Pi-Chun Yeh, Hsin-Chu (TW);
Shun-Chien Huang, Hsin-Chu (TW);
Ching-Sheng Cheng, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/438,884

(22) Filed: Feb. 22, 2017

(65) Prior Publication Data
US 2017/0262106 A1 Sep. 14, 2017

(30) Foreign Application Priority Data
Mar. 9, 2016 (TW) .............................. 105107192 A

(51) Int. Cl.
*G09G 1/00* (2006.01)
*G06F 3/041* (2006.01)
*G09G 3/20* (2006.01)

(52) U.S. Cl.
CPC .......... *G06F 3/0412* (2013.01); *G06F 3/0416* (2013.01); *G09G 3/2092* (2013.01); *G09G 2310/0297* (2013.01)

(58) Field of Classification Search
CPC ...... G06F 3/041; G06F 3/0412; G06F 3/0416; G09G 3/2092; G09G 3/20; G09G 3/36
See application file for complete search history.

(56) References Cited

U.S. PATENT DOCUMENTS

| | | | |
|---|---|---|---|
| 5,532,615 A | 7/1996 | Kondo et al. | |
| 8,362,999 B2 | 1/2013 | Huang et al. | |
| 2016/0370940 A1* | 12/2016 | Zhao | ..................... G06F 3/0416 |
| 2017/0185194 A1* | 6/2017 | Kim | ..................... G06F 3/0412 |

FOREIGN PATENT DOCUMENTS

TW I352952 3/2008

* cited by examiner

*Primary Examiner* — Michael Faragalla
(74) *Attorney, Agent, or Firm* — WPAT, PC

(57) ABSTRACT

A touch display device includes a plurality of scan lines including first portion scan lines and second portion scan lines; a plurality of data lines crossing the plurality of scan lines; a scan driver outputs a plurality of first portion scan signals to the first portion scan lines in a first display scan period in a frame, a plurality of second portion scan signals to the second portion scan lines in a second display scan period in the frame; and a data driver outputs a plurality of first portion display signals corresponding to the plurality of first portion scan signals in the first display scan period; a plurality of second portion display signals corresponding to the plurality of second portion scan signals in the second display scan period.

10 Claims, 6 Drawing Sheets

US 10,209,798 B2

TOUCH DISPLAY DEVICE

FIELD OF THE INVENTION

The present invention relates to a touch display device, and more particularly, to a display device with touch function.

BACKGROUND OF THE INVENTION

With the widespread of various electronic devices, touch display devices with both touch and display functions are widely used. Though display technology improves rapidly in many aspects such as resolution, contrast ratio and picture quality, for touch display devices, it is still challenging to both fulfill the need of high display quality and accurate touch detection.

SUMMARY OF THE INVENTION

An objective of the present invention is to provide a touch display device comprising: a touch display panel comprising: a plurality of scan lines, disposed on the touch display panel, including first portion scan lines and second portion scan lines; and a plurality of data lines crossing the plurality of scan lines; a scan driver configured to output a plurality of first portion scan signals to the first portion scan lines in a first display scan period in a frame and a plurality of second portion scan signals to the second portion scan lines in a second display scan period in the frame; and a data driver configured to, in the first display scan period, output a plurality of first portion display signals corresponding to the plurality of first portion scan signals and a plurality of second portion display signals corresponding to the plurality of second portion scan signals, and output a plurality of touch data signals to the plurality of data lines in a first touch scan period which is between the first display scan period and the second display scan period, wherein the first touch scan period comprises a first period and a second period, the touch data signals have a fixed voltage level in the first period in the first touch scan period, and the touch data signals have a first touch data signal and a second touch data signal in the second period in the first touch scan period, the first touch data signal and the second data signal have voltage levels different from the fixed voltage level.

Another objective of the present invention is to provide a touch display device comprising: a plurality of scan lines including first portion scan lines and second portion scan lines; a plurality of data lines crossing the plurality of scan lines; a scan driver configured to output a plurality of first portion scan signals to the first portion scan lines in a first display scan period in a frame, a plurality of second portion scan signals to the second portion scan lines in a second display scan period in the frame, and a predetermined voltage level in a first touch scan period between the first display scan period and the second display scan period; and a data driver configured to output a plurality of first portion display signals corresponding to the plurality of first portion scan signals in the first display scan period, a plurality of second portion display signals corresponding to the plurality of second portion scan signals in the second display scan period, and a first touch data signal and a second touch data signal in the first touch scan period.

DETAILED DESCRIPTION

Figure 1:
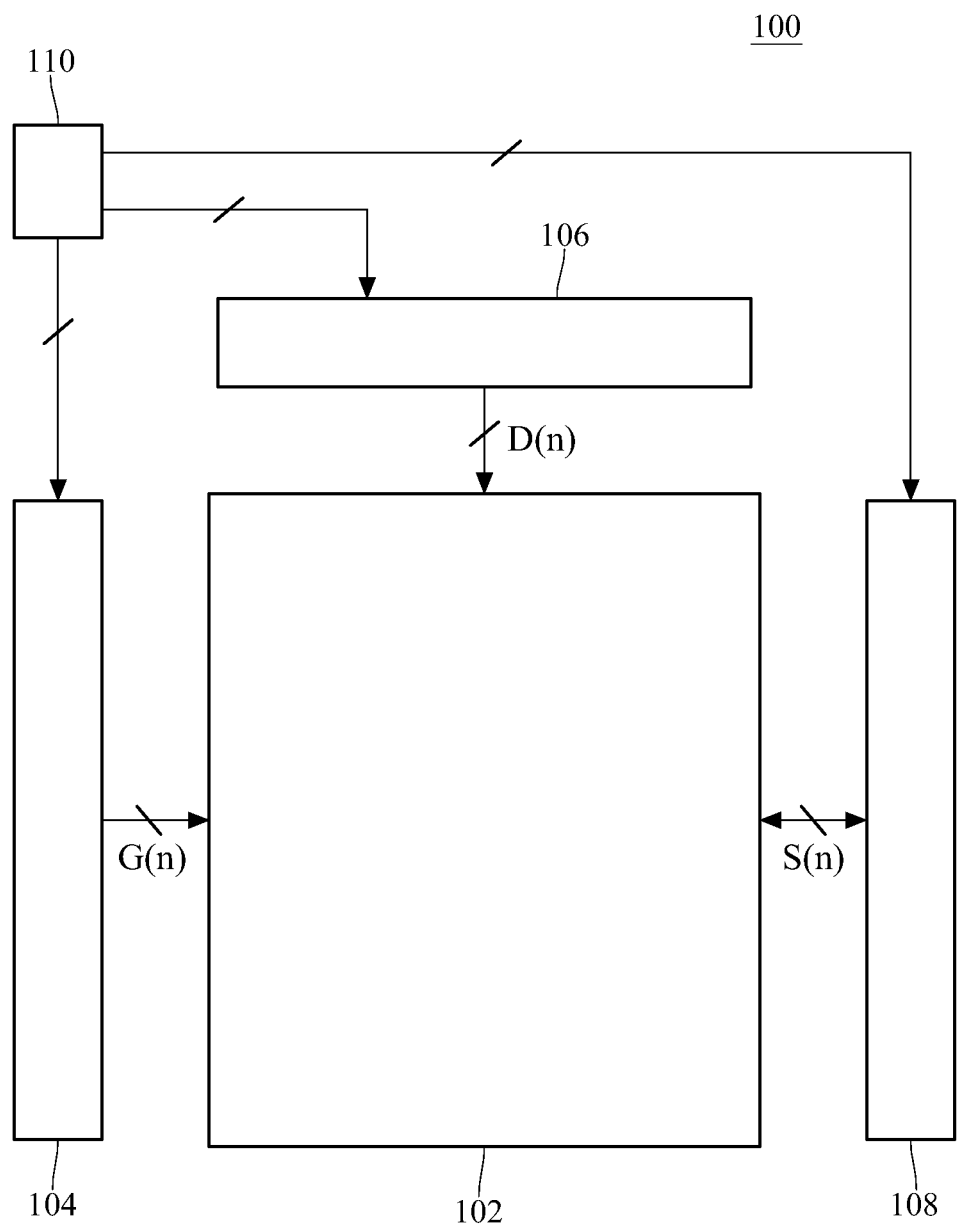
FIG. 1 is a schematic diagram of a touch display device according to one embodiment of the present invention.

Refer to FIG. 1 which is a schematic diagram of a touch display device 100 according to one embodiment of the present invention. The touch display device 100 comprises a touch display panel 102, a scan driver 104, a data driver 106, a touch driver 108, and a timing controller 110. The touch display device 104 has both touch and display functions. The scan driver 104 is configured to output scan signals G(n). The data driver 106 is configured to output data signals D(n). The touch driver 108 is configured to outputting and receiving touch signal S(n). The scan driver 104, the data driver 106 and the touch driver 108 are capable of driving the touch display panel 102 to perform touch display functions. The timing controller 110 are capable of transmitting, for example, control signals, power signals, or data signals to the gate driver 104, data driver 106 and touch driver 108 so as to make all of these drivers cooperate properly. It is to be noted that the scan driver 104, the data driver 106, the touch driver 108 or the timing controller can be separately implemented in different circuits or chips or integrated into one circuit or chip, the invention is not limited thereto. In certain embodiments, touch display panel 102 comprises a display panel and a touch panel; the display panel could be, for example, liquid crystal display panels (LCDs), organic light emitting diode panels, flexible panels, electroluminescent panels or any other types of display panels. Touch display panel 102 could be formed by assemble a display panel and a touch film or implement a touch function on a display panel to form an in-cell type touch display device.

Figure 2A:
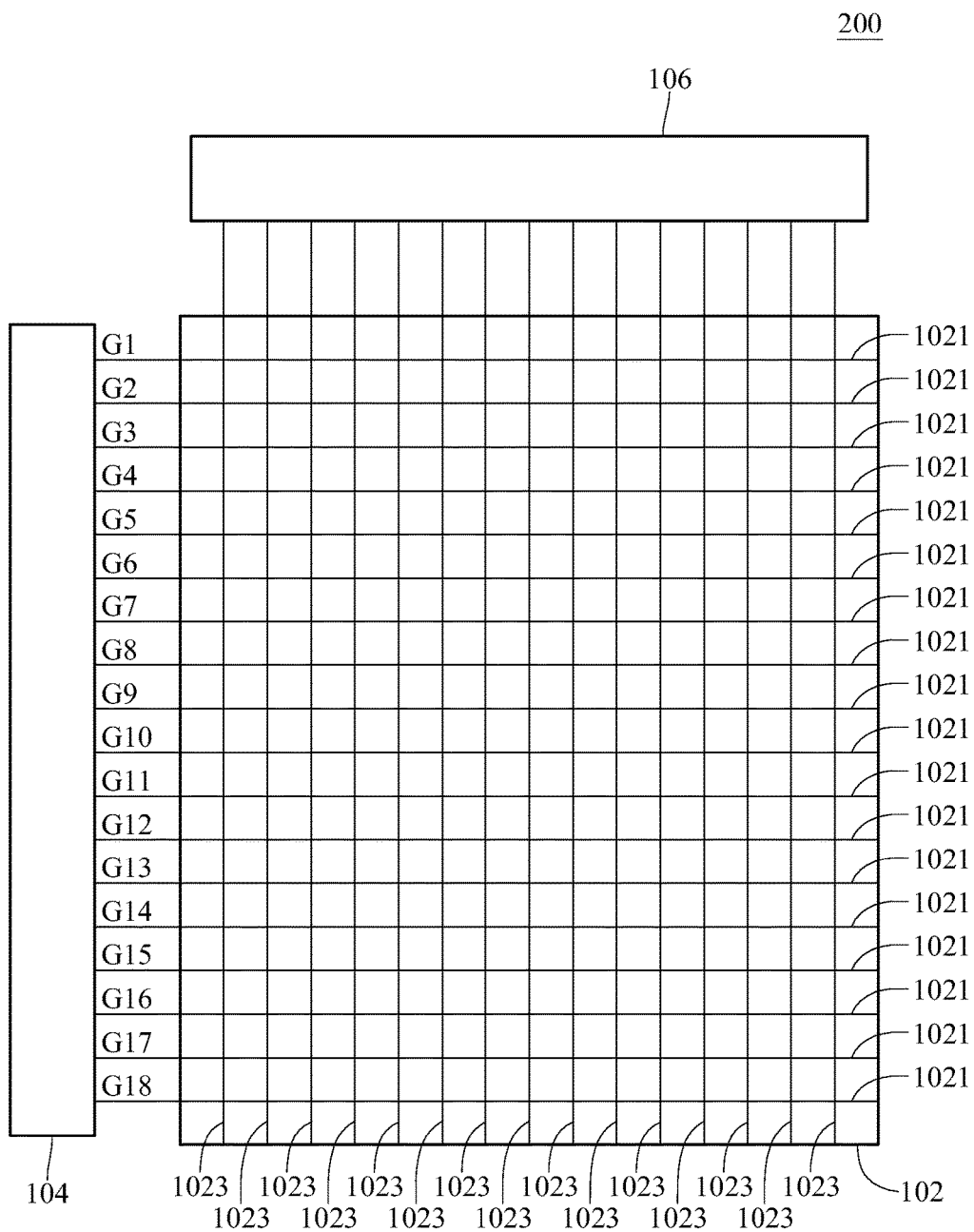
FIG. 2A is a schematic diagram of a portion of a touch display device according to one embodiment of the present invention.

FIG. 2A is a schematic diagram of a portion of the touch display device 100 according to one embodiment of the present invention. The touch display device 100 includes a touch display panel 102, a gate driver 104, a data driver 106, a plurality of scan lines 1021 and a plurality of data lines 1023. The gate driver 104 is configured to sequentially output a plurality of scan signals G1-G18 to the plurality of scan lines 1021, and the data driver 106 is configured to output data signals D(n) to the plurality of data lines 1023. The number of the scan lines 1021 and data lines 1023 in FIG. 2A is for illustration and the invention is not limited thereto.

Figure 2B:
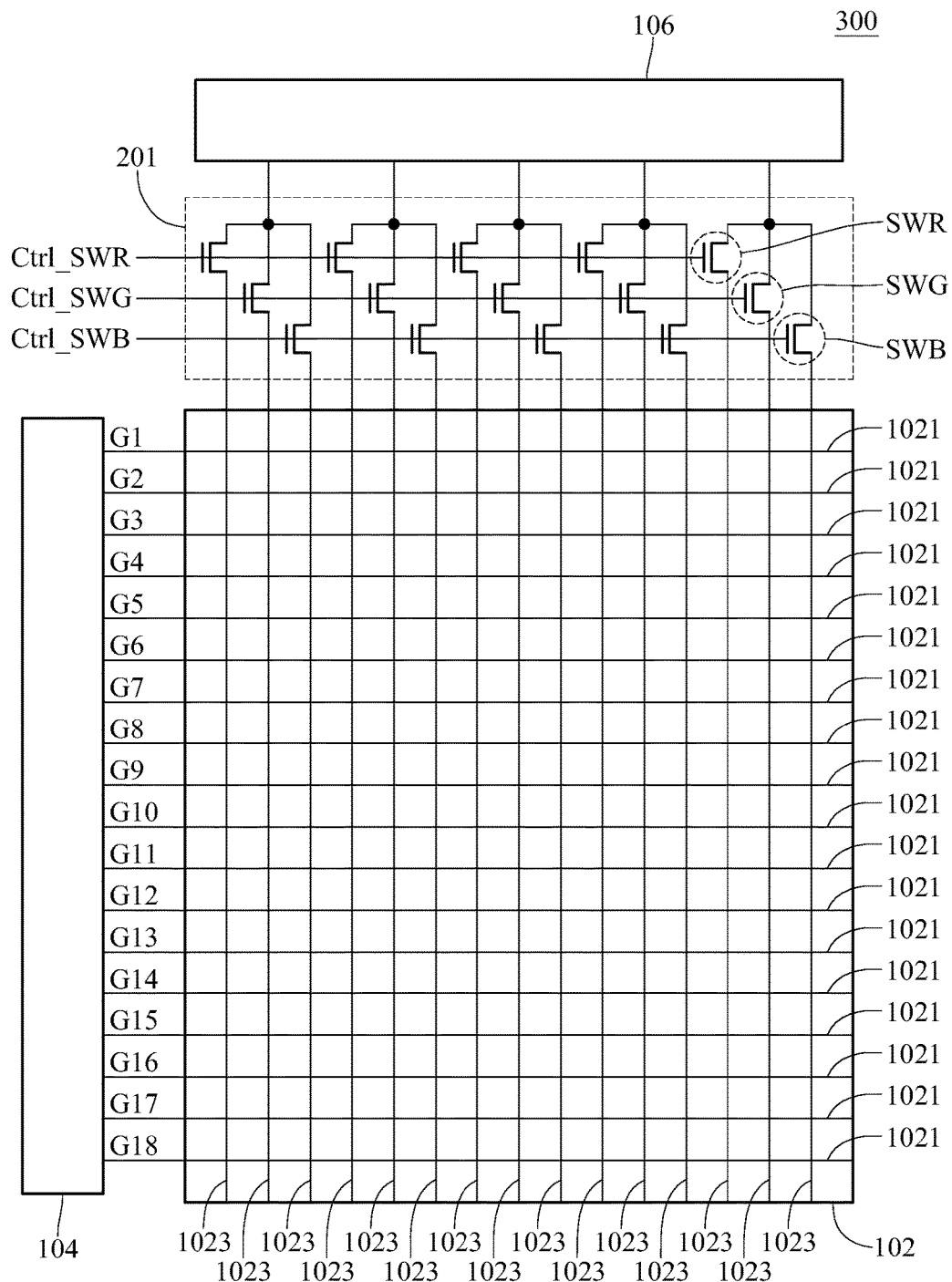
FIG. 2B is a schematic diagram of a touch display device having a multiplexer according to one embodiment of the present invention.

FIG. 2B is a schematic diagram of a portion of a touch display device 300 having a multiplexer according to one embodiment of the present invention. Compared with the embodiment in FIG. 2A, a multiplexer 201 is further included in the embodiment in FIG. 2B. The multiplexer 201 comprises switches SWR, SWG, and SWB which are electrically connected between the data driver 106 and the data lines 1023 and respectively responsive to control signals Ctrl_SWR, Ctrl_SWG, and Ctrl_SWB to determine the electrical connection between the data driver 106 and the data lines 1023.

Figure 3:
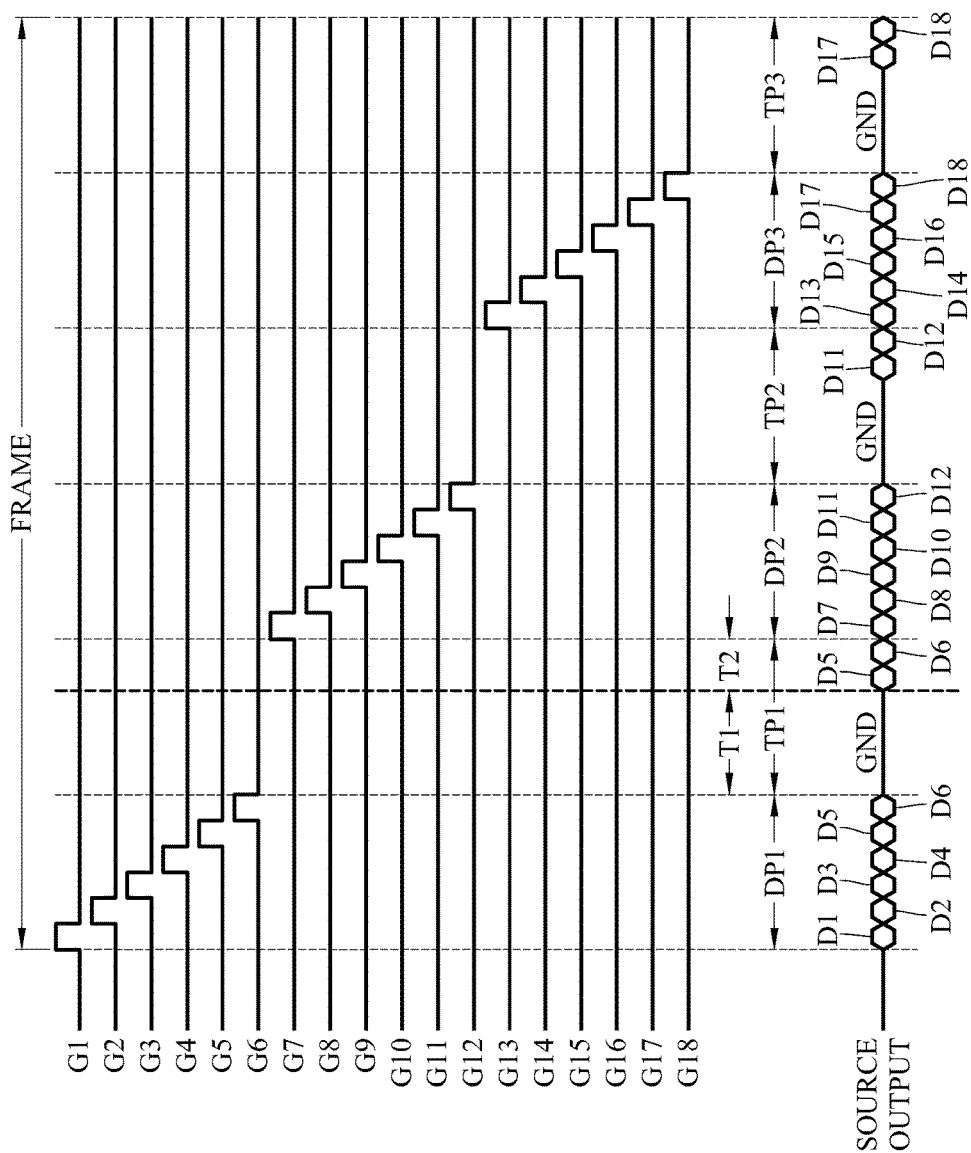
FIG. 3 is a schematic diagram of a driving waveform of a touch display device according to one embodiment of the present invention.

FIG. 3 is a schematic diagram of a driving waveform of a touch display device according to one embodiment of the present invention, and the label SOURCE OUTPUT denotes the data signals outputted from the data driver 106. Referring to FIG. 1, FIG. 2A and FIG. 3, the touch display device 100 comprises the touch display panel 102, the scan driver 104, and the data driver 106. The touch display panel 102 comprises a plurality of scan lines 1021 disposed thereon and a plurality of data lines 1023 crossing the plurality of scan lines 1021. The plurality of scan lines 1021 comprises a first portion scan lines for receiving a first portion scan signals G1-G6 and a second portion scan lines for receiving a second portion scan signals G7-G12. The scan driver 104 is configured to output the first portion scan signals G1-G6 to a first portion scan lines in a first scan display period DP1 in a frame and the second portion scan signals G7-G12 to a second portion scan lines in a second scan display period DP2 in the frame. The data driver 106 is configured to, in the first display scan period DP1, output a plurality of first portion display signals D1-D6 corresponding to the plurality of first portion scan signals G1-G6 and a plurality of second portion display signals D7-D12-corresponding to the plurality of second portion scan signals G7-G12, and output a plurality of touch data signals to the plurality of data lines 1023 in a first touch scan period TP1 which is between the first display scan period DP1 and the second display scan period DP2, wherein the first touch scan period TP1 comprises a first period T1 and a second period T2, the touch data signals have a fixed voltage level in the first period T1 in the first touch scan period TP1, and the touch data signals have a first touch data signal and a second touch data signal in the second period T2 in the first touch scan period TP1, the first touch data signal and the second data signal have voltage levels different from the fixed voltage level. The fixed voltage level, for example, could be a grounded voltage level (GND), a zero-gray level voltage level, a 255 gray-level voltage or floating. The fixed voltage level denoted GND as shown in FIG. 3 is for illustration but the invention is not limited thereto. During the second period T2, the data driver 106 is configured to output a first touch data signal and a second touch data signal whose voltage levels are different from the fixed voltage level. In the first touch scan period TP1, the scan driver 106 stops outputting scan signals to the scan lines 1021.

In certain embodiments, in the first display scan period DP1 and second display scan period DP2, the scan signals G(n) and the data signals D(n) are correspondingly outputted. For example, the data driver 106 correspondingly outputs the data signal D1 when the scan driver 104 outputs the scan signal G1, and the data driver 106 correspondingly outputs the data signal D2 when the scan driver 104 outputs the scan signal G2.

Please refer to FIGS. 3, D5 and D6 are the last two first portion display data signals outputted by the data driver 106 in the first display scan period DP1, and D5 and D6 are respectively equal to the first touch data signal and the second touch data signal in the second period T2 in the first touch scan period T1. That is, the second-last first portion display signal D5 in the first display scan period and the first touch data signal in the second period are the same; the last first portion display signal D6 in the first display scan period DP1 and the second touch data signal in the second period are the same. In certain embodiments, the first second portion display signal D7 in the second display scan period DP2 is subsequent to the second touch data signal in the second period. That is, there may be no other signals between the second display data signal D7 and the second touch data signal. Referring further to FIG. 3, the frame may further comprise a third display scan period DP3 and a second touch scan period TP2, and the second touch scan period is between the second display scan period DP2 and the third display scan period DP3.

Figure 4A:
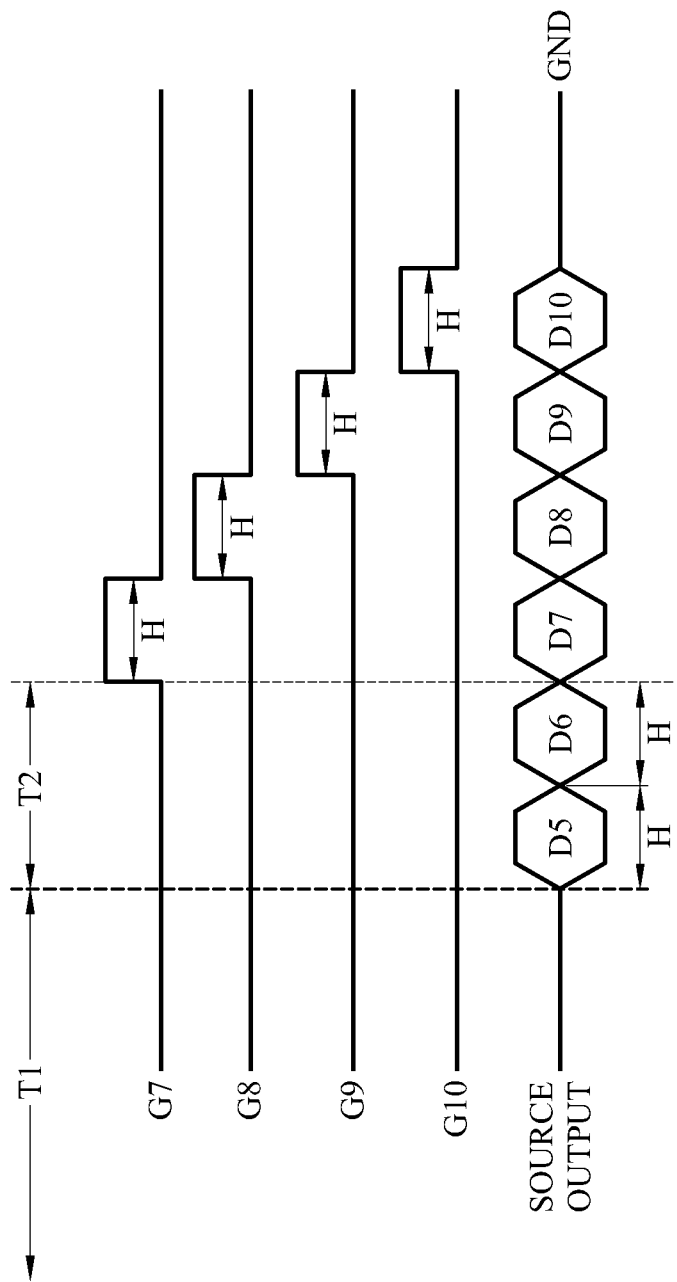
FIG. 4A is a schematic diagram of a driving waveform of a touch display device according to one embodiment of the present invention.

FIG. 4A is a schematic diagram of a driving waveform of a touch display device according to one embodiment of the present invention. Please refer to both FIG. 3 and FIG. 4A. According to the embodiment, the plurality of scan signals for driving scan lines 1021 are non-overlapped and each of the plurality of scan signals has a pulse width 1H. The second period T2 in the first touch scan period TP1 has a time length substantially equal to twice the pulse width 2H.

Figure 4B:
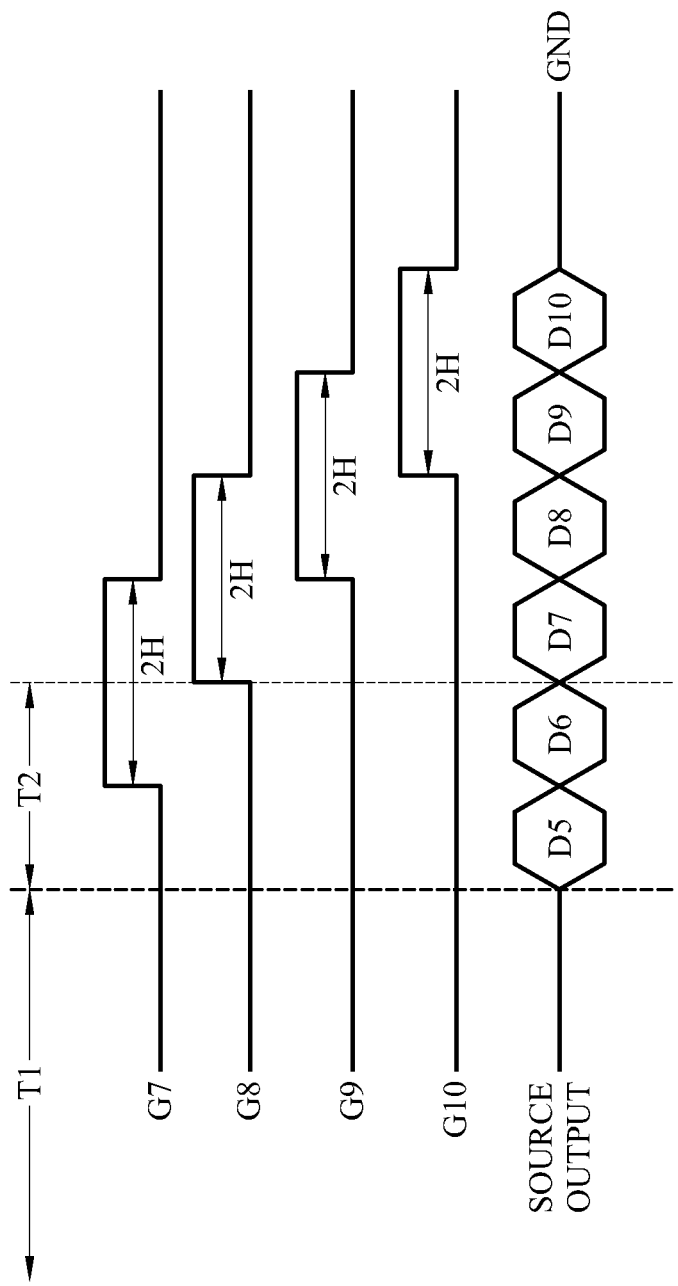
FIG. 4B is a schematic diagram of a driving waveform of a touch display device according to one embodiment of the present invention.

FIG. 4B is a schematic diagram of a driving waveform of a touch display device according to one embodiment of the present invention. Please refer to both FIG. 3 and FIG. 4B. According to the embodiment, the plurality of scan signals for driving scan lines 1021 are overlapped and each of the plurality of scan signals has a pulse width 2H. The second period T2 in the first touch scan period TP1 has a time length substantially equal to the pulse width 2H.

In accordance with the embodiments above, by applying the first touch data signal and the second touch data signal to the data lines in the touch display devices, the display quality could be improved.

What is claimed is:

1. A touch display device, comprising:
 a touch display panel comprising:
  a plurality of scan lines, disposed on the touch display panel, including first portion scan lines and second portion scan lines; and
 a plurality of data lines crossing the plurality of scan lines;
  a scan driver for outputting a plurality of first portion scan signals to the first portion scan lines in a first display scan period in a frame and a plurality of second portion scan signals to the second portion scan lines in a second display scan period in the frame; and
  a data driver for outputting a plurality of first portion display signals corresponding to the plurality of first portion scan signals in the first display scan period, for outputting a plurality of second portion display signals corresponding to the plurality of second portion scan signals in the first display scan period, and for outputting a plurality of touch data signals to the plurality of data lines in a first touch scan period which is between the first display scan period and the second display scan period;
  wherein the first touch scan period comprises a first period and a second period, the touch data signals have a fixed voltage level in the first period, and the touch data signals have a first touch data signal and a second touch data signal in the second period, the first touch data signal and the second touch data signal have voltage levels different from the fixed voltage level.

2. The touch display device of claim 1, wherein a second-last first portion display signal in the first display scan period and the first touch data signal in the second period are same, and a last first portion display signal in the first display scan period and the second touch data signal in the second period are same.

3. The touch display device of claim 2, wherein the plurality of first portion scan signals is non-overlapped.

4. The touch display device of claim 2, wherein the plurality of first portion scan signals is overlapped.

5. The touch display device of claim 3, further comprising a multiplexer, electrically connected between the data driver and the plurality of data lines.

6. The touch display device of claim 2, the frame further comprising a third display scan period and a second touch scan period between the second display scan period and the third display scan period.

7. The touch display device of claim 2, further comprising a touch driver for outputting a touch driving signal to the touch display device.

8. A touch display device comprising:
   a plurality of scan lines including first portion scan lines and second portion scan lines;
   a plurality of data lines crossing the plurality of scan lines;
   a scan driver for outputting a plurality of first portion scan signals to the first portion scan lines in a first display scan period in a frame, for outputting a plurality of second portion scan signals to the second portion scan lines in a second display scan period in the frame, and for outputting a predetermined voltage level in a first touch scan period between the first display scan period and the second display scan period; and
   a data driver for outputting a plurality of first portion display signals corresponding to the plurality of first portion scan signals in the first display scan period, for outputting a plurality of second portion display signals corresponding to the plurality of second portion scan signals in the second display scan period, and for outputting a first touch data signal and a second touch data signal in the first touch scan period.

9. The touch display device of claim 8, wherein last two first portion display signals in the first display scan period respectively equal to the first touch data signal and the second touch data signal in the first touch scan period.

10. The touch display device of claim 9, wherein the second touch data signal is subsequent to the first touch data signal.

\* \* \* \* \*